March 21, 1939.  H. T. SEELEY  2,151,161
CONTROL SYSTEM
Filed Aug. 18, 1938

Inventor:
Harold T. Seeley,
by Harry E. Dunham
His Attorney.

Patented Mar. 21, 1939

2,151,161

UNITED STATES PATENT OFFICE 2,151,161

CONTROL SYSTEM

Harold T. Seeley, Lansdowne, Pa., assignor to General Electric Company, a corporation of New York Application August 18, 1938, Serial No. 225,610

15 Claims. (Cl. 171—118)

My invention relates to control systems and particularly to systems for controlling the application and removal of the excitation of a synchronous machine.

One object of my invention is to provide an improved control system for effecting the application of the excitation to the field winding of a synchronous machine at the proper time so that the machine can synchronize its maximum load.

Another object of my invention is to provide an improved arrangement of apparatus for effecting a predetermined electrical connection of a synchronous machine at a predetermined optimum point in the slip cycle of the machine when it is operating subsynchronously as an induction machine.

Another object of my invention is to provide an improved control system for controlling the excitation of a synchronous machine in response to the armature current pulsations produced by weakly exciting the field winding while the machine is operating at subsynchronous speeds.

This application is a continuation in part of my application, Serial No. 157,529, filed August 5, 1937, and assigned to the same assignee as this application.

Figure 1:
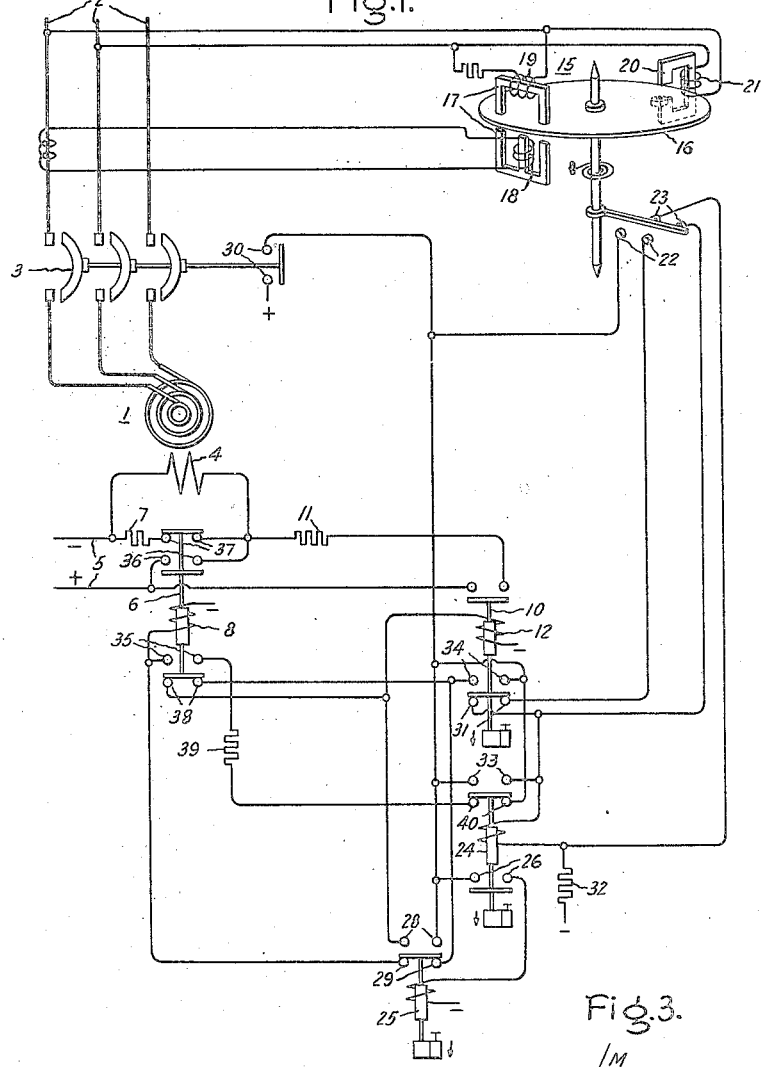
Figure 2:
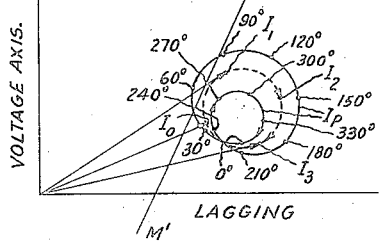
Figure 3:
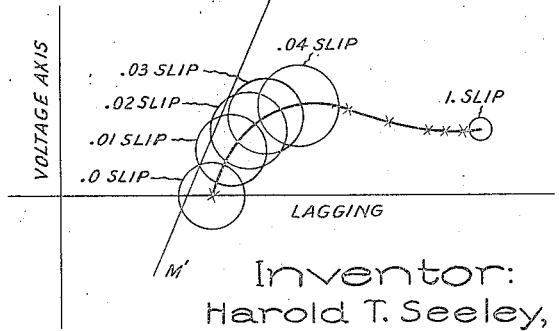

My invention will be better understood from the following description when taken in connection with the accompanying drawing, Fig. 1 of which diagrammatically illustrates a synchronous motor control system embodying my invention, and Figs. 2 and 3 of which are explanatory diagrams, and the scope of my invention will be pointed out in the appended claims.

Referring to Fig. 1 of the drawing, I represents a synchronous motor having an armature winding which is arranged to be connected to a suitable polyphase supply circuit 2 by means of a switch 3 which may be of any suitable type, examples of which are well known in the art. While I have shown a manually controlled switch 3, it will be obvious to those skilled in the art that any suitable automatic means may be employed for controlling the opening and closing of this switch. The motor I is also provided with a field winding 4 which is arranged to be connected directly to a suitable source of excitation 5 by means of a field switch 6. This switch 6, when open, is arranged to connect suitable impedance means, such as a discharge resistor 7, across the terminals of the field winding 4. The switch 6 is provided with an operating winding 8 which, when energized, moves the switch 6 from the position in which it is shown to its other position in which the source of excitation 5 is connected directly to the field winding 4.

In accordance with my invention, I provide an improved arrangement of apparatus for controlling the closing of the field switch 6 in response to predetermined characteristics of the current pulsations produced in the motor armature circuit while the motor is operating as a induction motor so that the field switch 6 is closed at a predetermined optimum point in the slip cycle after the motor has accelerated to a predetermined speed as an induction motor.

When an unexcited salient pole synchronous machine is operating subsynchronously as an induction machine, the magnitude and phase of the armature current of the machine pulsate over predetermined ranges during each half cycle of slip. This will be seen more clearly from Fig. 2 which is a polar diagram of the current in one phase of the armature winding of the synchronous machine. In this Fig. 2, the vector $I_0$ represents the armature phase current at a given slip when a predetermined angular relation exists between the axes of the unexcited salient field poles and the rotating magnetic poles set up by the armature current. The vector $I_1$ represents current in the same phase at the same slip when the angular displacement between the armature and field poles has been increased 45°; the vector $I_2$ represents the same phase current at the same slip when the angular displacement of the rotor poles has been increased another 45° or a total of 90°; and the vector $I_3$ represents the same phase current at the same slip when the angular displacement of the field poles has been increased another 45° or a total of 135° from the angle position which produce the current represented by the vector $I_0$. The circle $I_0$, $I_1$, $I_2$, $I_3$, therefore represents the locus of the ends of the phase current vectors during one of the half cycles of slip of the unexcited synchronous machine while running at a given constant subsynchronous speed and each point on this circle represents the armature current at a definite point in this half cycle of slip. Since each field pole is unexcited, the same armature current pulsation is produced each time the field poles slip the distance of one pole pitch with respect to the armature poles. Therefore, the circle $I_0$, $I_1$, $I_2$, $I_3$, also represents the locus of the ends of the phase current vectors during the other half cycle of each slip cycle of the machine while running at a predetermined constant subsynchronous speed. Consequently each point on this circle represents the armature current at two definite points in the slip cycle at this particular subsynchronous speed.

From this Fig. 2, it will be seen that during each half cycle of slip at a given subsynchronous speed the magnitude and also the phase angle of the armature current of an unexcited synchronous machine vary over predetermined ranges. These ranges, however, are different for each subsynchronous speed of the machine as will be seen more clearly from Fig. 3 which is a similar polar diagram of one of the armature phase currents except that several circles are shown which represent the loci of the phase current vectors of the armature current at different subsynchronous speeds.

Since the same armature current pulsation is produced during each half cycle of slip when an unexcited synchronous machine is operating at a given subsynchronous speed as an induction machine, any device which is arranged to respond at a predetermined point of a particular armature current pulsation of such a machine may respond, therefore, at one or the other of two definite points in the slip cycle. However, if the field winding of the synchronous machine, while it is operating subsynchronously as an induction machine, is excited by a small amount of direct current, I find that for any given subsynchronous speed, the phase and magnitude ranges over which the armature current varies during one of the half cycles of slip differ materially from the phase and magnitude ranges over which the armature current varies during the other half cycle of slip. For example, in Fig. 2, instead of $I_0$, $I_1$, $I_2$, $I_3$, representing the locus of the ends of the phase current vector during each of the two half cycles of induced field current at a given slip, the locus is changed so that the re-entrant, Limacon-shaped curve $I_D$ is the locus of the phase current vector during each cycle of slip. On this curve the portion from the 270 degree point around to the 90 degree point represents the armature circuit conditions while the energized field poles of a given polarity are passing armature magnetic poles of opposite polarity and the portion from the 90 degree point around to the 270 degree point represents the armature current conditions while the energized field poles of the same given polarity are passing armature magnetic poles of like polarity. A similar change is produced in the locus of the armature current vector at every other subsynchronous speed of the excited machine.

Therefore, in accordance with my invention, I weakly excite the field winding of the synchronous machine while it is operating subsynchronously as an induction machine and provide means which responds to a predetermined armature current pulsation characteristic which occurs during one of the armature current pulsations produced at a predetermined subsynchronous speed and which does not occur during the other armature current pulsation produced at the same predetermined subsynchronous speed or at any lower subsynchronous speed. In this way I am able to effect the application of normal field excitation to the machine at the proper point in the slip cycle to produce the best synchronizing operation, that is, when the angular position of the field poles and the rotating armature flux has a selected optimum value.

For applying the weak excitation to the field winding 4 in the particular embodiment of my invention, shown in Fig. 1 of the drawing, I provide a switch 10 which, when closed, connects the field winding 4 to the source of excitation 5 with a relatively high impedance, such as a resistance 11, in series. The switch 10 is provided with a closing coil 12, the circuit of which is controlled by the switch 3 so that the switch 10 can be closed to apply a weak excitation to the field winding 4 only when the switch 3 is closed.

For effecting the closing of the field switch 6 when the motor 1 reaches the speed at which it is desired to synchronize the motor, I employ, in the embodiment of my invention shown in the drawing, armature current responsive means of the type disclosed in my copending application, Serial No. 153,953, filed July 16, 1937, and assigned to the same assignee as this application. This armature current responsive means includes a relay 15 having a rotatable member 16 and a wattmetric driving element 17 that includes a current winding 18 energized in response to the current in one of the polyphase conductors supplying current to the armature winding of the motor 1 and a voltage winding 19 connected across one of the phases of the supply circuit 2.

The driving element 17 exerts on the movable member 16 in a direction to close contacts 22 and open contacts 23 a torque proportional to $EI \sin(\theta - \phi)$ where E represents the supply circuit voltage applied to the circuit of the voltage winding 19, I represents the current in the supply circuit conductor to which the current winding 18 is connected, $\theta$ represents the power factor angle or the angle by which the current I lags behind its phase voltage and $\phi$ represents the angle by which the current in the voltage winding 19 lags behind the current I when $\theta$ is zero; that is, when I is at unity power factor. Therefore, since $$I = \frac{E}{Z}$$

the wattmetric device 17 produces a torque proportional to $$\frac{E^2}{Z} \sin(\theta - \phi)$$

where Z represents the impedance of the circuit through which the current I flows.

The rotatable member 16 is also provided with another driving element 20 which has a voltage driving element 21 connected to one of the phases of the supply circuit 2 and which is designed so as to exert a torque on the rotatable element 16 in a direction to open the contacts 22 and close the contacts 23. As shown in the drawing, the voltage winding 21 is connected to the same phase of the supply circuit 2 to which the voltage winding 19 of the wattmetric device 17 is connected so that the torque exerted by the driving element 20 is proportional to $KE^2$, where K represents a constant. Therefore, the resultant torque exerted on the movable element 16 by the two driving elements 17 and 20 is proportional to $$\frac{E^2}{Z} \sin(\theta - \phi) - KE^2 \text{ or } E^2 \left[ \frac{\sin(\theta - \phi)}{Z} - K \right]$$

By varying the relative phases of the currents in the windings 18 and 19 of the relay 15 in any well known manner, as for example by changing the electrical constants of the circuit of one or both of these windings, the relay zero torque characteristic, which is substantially a straight line, can be made to have any desired slope and by varying the torque exerted by the driving element 20 the distance of this zero torque characteristic from the origin can be adjusted to any desired value. If, for example, the relay 15 is adjusted so that it has a zero torque characteristic corresponding to the line MM' in Figs. 2 and 3, the relay 15 maintains its contacts 23 open and its contacts 22 closed whenever the magnitude and phase angle of the armature current is such that the current vector terminates at the right of the line MM' and closes its contacts 23 and opens its contacts 22 whenever the magnitude and phase angle of the armature current is such that the current vector terminates at the left of the line MM'.

With such a zero torque characteristic as MM' and with an armature current characteristic $I_P$, it will be seen from Figs. 2 and 3 that during a predetermined portion of one of the half cycles of slip at a predetermined subsynchronous speed the contacts 22 of relay 15 are open whereas during the entire other half cycle of slip at the same predetermined speed the contacts 22 remain closed. From Fig. 3 it will be obvious that the phase and magnitude ranges over which the armature current varies are such that the relay 15 does not begin to open its contacts 22 during a portion of any armature current pulsation until the motor has accelerated to a speed near synchronous speed. Furthermore, it will be seen that the length of time the relay 15 maintains its contacts 22 open and its contacts 23 closed also depends upon the frequency of the current pulsations and increases materially as the speed of the machine approaches synchronous speed. For example, the length of time the contacts 22 remain open at 2% slip is at least 50% longer than at 3% slip. Therefore, as a means for determining the slip frequency of the machine at which to apply normal field excitation, I provide an adjustable timing device, shown as a time delayed drop out relay 24 with its energizing winding in series with the contacts 22, for measuring the time the contacts 22 remain open during any armature current pulsation. From Figs. 2 and 3 it will be apparent that relay 24 can complete its timing operation only when the speed of the synchronous machine has increased to such value that the armature current vector, during one of the armature current pulsations, remains to the left of the zero torque characteristic MM' for a predetermined definite time. At this predetermined subsynchronous speed, the relay 24 drops out and opens its contacts 26 and 33 and closes its contacts 40 at a definite point in one of the armature current pulsations, and therefore at a definite point in the slip cycle. Since this particular point in the slip cycle may not be the optimum point at which to complete the closing circuit of the field switch 6, I provide a second adjustable timing device shown as another time delayed drop out relay 25, which is energized when the contacts 26 of time relay 24 are closed and which, when deenergized for a predetermined time, completes an energizing circuit for the closing coil 8 of the field switch 6.

The operation of the arrangement shown in the drawing is as follows: When it is desired to start the motor 1, the switch 3 is closed so that the full voltage of the supply circuit 2 is applied to the armature winding of the motor 1 to cause the motor to start from rest as an induction motor. The motor armature current that flows as soon as the switch 3 is closed is of such a magnitude and phase that it causes the wattmetric element 17 of relay 15 to produce sufficient torque to close the contacts 22 and open the contacts 23. The closing of the contacts 22 completes, through the contacts 30 of the switch 3, the contacts 31 of the switch 10 and the resistor 32, an energizing circuit for the winding of relay 24. The relay 24 immediately moves to its energized position, and the closing of its contacts 33 completes a holding circuit for itself which is independent of the contacts 22 of the relay 15 and the contacts 31 of the switch 10. The closing of the contacts 26 of the relay 24 completes an energizing circuit for the relay 25 through the contacts 30 of the switch 3. By closing its contacts 28, the relay 25 completes through the contacts 30 of switch 3 an energizing circuit for the closing coil 12 of the switch 10 so that a weak excitation is applied to the field winding 4. This excitation is preferably of such a value as to produce the necessary difference in the armature current pulsations so that relay 15 can distinguish between them without materially affecting the induction motor torque developed by the motor during the starting operation. The closing of the contacts 34 of the switch 10 completes a holding circuit for its closing coil 12 through contacts 38 of the field switch 6 and contacts 30 of the switch 3.

From Figs. 2 and 3, it will be seen that as long as the motor speed is below a predetermined value, the magnitudes and phases of the armature current pulsations are such that the contacts 22 remain closed. When, however, the motor speed increases above this predetermined value, the magnitude and phase of the motor armature current is such that during a portion of the armature current pulsation produced during each slip cycle, the relay 15 maintains its contacts 22 open and its contacts 23 closed. However, the relay 24, the winding of which is short circuited when the contacts 23 are closed, does not move to its deenergized position until the motor speed has reached such a value that the frequency of the armature current pulsations is such that the duration of the portion of the current pulsation, during which the contacts 22 are open and contacts 23 are closed, is just long enough to allow the relay 24 to drop out and thereby open its contacts 33 in its own holding circuit. The opening of the contacts 26 of the relay 24 interrupts the energizing circuit for the time relay 25 so that a predetermined time after the relay 24 moves to its deenergized position, the relay 25 completes an energizing circuit for the closing coil 8 of the field switch 6. This energizing circuit also includes the contacts 30 of the switch 3 and the contacts 34 of the switch 10. By closing its auxiliary contacts 35, the field switch 6 completes a locking circuit for its closing coil 8 through resistor 39, contacts 40 of relay 24 and contacts 30 of switch 3. By closing its main contacts 36, the field switch 6 connects the field winding 4 directly to the source of excitation 5 so that the field winding is supplied with sufficient direct current to cause the motor to pull into synchronism promptly. The opening of the contacts 37 of the field switch 6 disconnects the discharge resistor 7 from across the terminals of the field winding 4. By opening its contacts 38, the field switch 6 interrupts the holding circuit of the closing coil 12 of the switch 10 which moves to its normally open position after a predetermined time delay sufficiently long to permit the motor to pull into synchronism.

As long as the motor 1 remains in synchronism with the voltage of the supply circuit 4, the phase relation between the armature current and voltage and the magnitude of the armature current are such that relay 15 maintains its contacts 23 closed. When, however, the motor falls out of synchronism, the power factor of the motor becomes sufficiently lagging and the current becomes sufficiently great to cause the relay 15 to open its contacts 23 and close its contacts 22 so as to complete the heretofore described energizing circuit for the relay 24. The relay 24 immediately moves to its energized position. By opening its contacts 40, the relay 24 interrupts the holding circuit of the closing coil 8 of the field switch 6 so that the field winding 4 is immediately disconnected from the source of excitation 5, and the discharge resistor 7 is reconnected across the terminals of the field winding 4. The energization of the relay 24 then effects, in the manner heretofore described, the energization of the relay 25 and the switch 10 so that a weak excitation is applied to the motor field winding 4. The motor continues to operate as an induction motor until it again reaches a speed sufficiently high to cause the relay 24 to move to its deenergized position and effect, in the manner heretofore described, the closing of the field switch 6 so that it will connect the field winding 4 directly to the source of excitation 5.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. A control arrangement for a synchronous machine having an armature winding connected to an alternating current circuit including means for supplying a relatively weak excitation to said field winding, and means responsive to the current pulsations produced in said armature winding due to said weak excitation while said machine is operating at subsynchronous speeds for increasing the excitation applied to said field winding when the motor speed is above a predetermined value.

2. A control arrangement for a synchronous machine having an armature winding connected to an alternating current circuit including means for supplying a relatively weak excitation to said field winding, and means responsive to the frequency of the current pulsations produced in said armature winding due to said weak excitation while said machine is operating at subsynchronous speeds for increasing the excitation applied to said field winding when the motor speed is above a predetermined value.

3. A control system for a synchronous machine having an armature winding connected to an alternating current circuit including means for supplying a relatively weak excitation to said field winding, and means responsive to the frequency of the current pulsations produced in said armature winding due to said weak excitation while said machine is operating at subsynchronous speeds for increasing the excitation applied to said field winding when the motor speed is above a predetermined value and a predetermined relation exists between the positions of the magnetic poles produced by the armature flux and the magnetic poles produced by the weak excitation in the field winding.

4. A control system for a synchronous machine having an armature winding connected to an alternating current circuit including a timing device, means dependent upon the pulsations of the current in said armature winding for effecting the operation of said timing device at an instant when a predetermined angular relation exists between the motor field poles and the rotating armature flux, and other timing means controlled by said first mentioned timing means for effecting the application of excitation to said field winding a predetermined time after said first mentioned timing means has been continuously operated for a predetermined time interval.

5. A control system for a synchronous machine having an armature winding connected to a source of alternating current including means for supplying a relatively weak excitation to said field winding, and means controlled by the current pulsations produced in said armature winding due to said weak excitation while said machine is operating at subsynchronous speeds for increasing the excitation supplied to said field winding when the angular relation between the field poles and the rotating armature flux has a selected optimum value.

6. In combination with a synchronous machine having an armature winding connected to a source of alternating current, means for supplying a relatively weak excitation to said field winding and means dependent upon the frequency and magnitude of the armature current pulsations while said machine is operating at subsynchronous speeds for effecting a change in the energization of one of said motor windings when the motor speed is above a predetermined value and a predetermined angular relation exists between the motor field poles and the rotating armature flux.

7. In combination with a synchronous machine having an armature winding connected to a source of alternating current, means for supplying a relatively weak excitation to said field winding, a timing device, means dependent upon the armature current pulsations while said machine is operating at subsynchronous speeds for initiating the operation of said timing device at a predetermined angular relation between the motor field poles and the rotating armature flux when the motor speed has increased to a predetermined value, and means responsive to the operation of said timing device for effecting a change in the connections of one of said motor windings to change the current flowing therein.

8. In combination with a synchronous machine having an armature winding connected to a source of alternating current, means for supplying a relatively weak excitation to said field winding, a timing device, means dependent upon the armature current pulsations while said machine is operating at subsynchronous speeds for initiating the operation of said timing device at a predetermined angular relation between the motor field poles and the rotating armature flux when the motor speed has increased to a predetermined value, and means responsive to the operation of said timing device for increasing the excitation of said field winding.

9. A control arrangement for a synchronous machine having an armature winding connected to a source of alternating current, including means for supplying a relatively weak excitation to said field winding, means dependent upon the pulsations produced in a predetermined function of the product of the motor armature current and the supply circuit voltage when the motor is operating at a subsynchronous speed for increasing the excitation supplied to said field winding when the angular relation between the field poles and the rotating armature flux has a selected optimum value.

10. A control arrangement for a synchronous machine having an armature winding connected to a source of alternating current, including means for supplying a relatively weak excitation to said field winding, a timing device, means dependent on a predetermined function of the product of the motor armature current and the supply circuit voltage for effecting the operation of said timing device at an instant when a predetermined angular relation exists between the motor field poles and the rotating armature flux, and timing means responsive to the operation of said timing device for effecting an increase in the excitation of said field winding.

11. In combination with a synchronous machine having an armature winding connected to an alternating current circuit, means for producing in said armature winding when said motor is operating at subsynchronous speeds a current change of one character when a predetermined portion of the motor field structure is passing poles of one polarity of the armature rotating field and a current change of a different character when said predetermined portion of the motor field structure is passing poles of the opposite polarity of the armature rotating field, and means dependent upon said differences in said armature current changes for controlling the excitation of said machine.

12. In combination with a synchronous machine having an armature winding connected to an alternating current circuit, means for producing in said armature winding when said motor is operating at subsynchronous speeds a current change of one character when a predetermined portion of the motor field structure is passing poles of one polarity of the armature rotating field and a current change of a different character when said predetermined portion of the motor field structure is passing poles of the opposite polarity of the armature rotating field, and means dependent upon said differences in said armature current changes for applying normal excitation to said machine when a selected optimum angular relation exists between the field structure and the rotating armature flux.

13. A control arrangement for establishing a predetermined electrical connection of a synchronous machine at a predetermined optimum point in the slip cycle when the machine reaches a predetermined speed as an induction machine including timing means having an adjustable definite time of operation, means responsive to a predetermined characteristic of the pulsations produced in the armature current when the machine is operating as an induction machine for initiating the timing operation of said timing means at a predetermined definite point in the slip cycle when the slip of the machine decreases to a predetermined value, and means responsive to said timing means completing its definite timing operation for establishing the predetermined electrical connection of said machine.

14. A control arrangement for establishing a predetermined electrical connection of a synchronous machine at a predetermined optimum point in the slip cycle when the machine reaches a predetermined speed as an induction motor including two timing means respectively having adjustable definite timing operations, means responsive to a predetermined characteristic of the pulsations produced in the armature current when the machine is operating as an induction machine for initiating the timing operation of one of said timing means and for maintaining said one of said timing means in operation as long as said predetermined armature current characteristic exists, means responsive to said one of said timing means completing its definite timing operation for initiating the timing operation of the other timing means, and means responsive to said other timing means completing its definite timing operation for establishing said predetermined electrical connection of said machine.

15. An arrangement for connecting a source of excitation to the field winding of a synchronous machine at a predetermined optimum point in the slip cycle when the machine reaches a predetermined speed as a induction motor including a time relay having a definite operating time, means for effecting the timing operation of said time relay only during that portion of a pulsation produced in the armature current when the machine is operating as an induction machine when a predetermined characteristic of the armature current exists, a second time relay having a definite operating time, means responsive to said first mentioned time relay completing its timing operation for initiating the operation of the said second time relay, and means responsive to said second time relay completing its timing operation for effecting the connection of the source of excitation to the field winding of said machine.

HAROLD T. SEELEY.